United States Patent
Anderson

(10) Patent No.: US 7,033,427 B2
(45) Date of Patent: Apr. 25, 2006

(54) COMPOSITION AND METHOD FOR COLORING THE SURFACE OF A POROUS SUBSTRATE

(75) Inventor: Stuart Anderson, Lane Cove (AU)

(73) Assignee: Silica Pacific Pty. Limited, (AU)

( * ) Notice: Subject to any disclaimer, the term of this patent is extended or adjusted under 35 U.S.C. 154(b) by 136 days.

(21) Appl. No.: 10/279,331

(22) Filed: Oct. 24, 2002

(65) Prior Publication Data

US 2004/0074421 A1    Apr. 22, 2004

(30) Foreign Application Priority Data

Oct. 22, 2002    (AU) ............................ 2002952194

(51) Int. Cl.
  *C09D 201/10*    (2006.01)
(52) U.S. Cl. ........................... 106/287.14; 106/287.15; 106/287.16
(58) Field of Classification Search ........... 106/287.14, 106/287.15, 287.16
  See application file for complete search history.

(56) References Cited

U.S. PATENT DOCUMENTS

| | | | | |
|---|---|---|---|---|
| 5,755,867 A | * | 5/1998 | Chikuni et al. | 106/287.16 |
| 5,807,430 A | * | 9/1998 | Zheng et al. | 106/287.11 |
| 6,165,256 A | * | 12/2000 | Hayakawa et al. | 106/13 |
| 6,432,191 B1 | * | 8/2002 | Schutt | 106/287.13 |
| 6,512,072 B1 | * | 1/2003 | Gantner et al. | 528/34 |
| 2003/0029193 A1 | * | 2/2003 | Feng et al. | 65/17.2 |

FOREIGN PATENT DOCUMENTS

| | | |
|---|---|---|
| CA | 2263667 | 9/2000 |
| DE | 10018645 | 9/2000 |
| EP | 0680940 | 11/1995 |
| GB | 2080149 | 2/1982 |
| JP | 59210150 A | 11/1984 |
| RU | 2097356 C | 11/1997 |
| RU | 2097357 C | 11/1997 |
| RU | 2106321 C | 3/1998 |
| RU | 2176225 C | 11/2001 |
| SU | 1691377 A | 11/1991 |
| SU | 1756325 A | 8/1992 |

OTHER PUBLICATIONS

Himics et al, "The importance of Particle Size in Liquid Coatings", PF ONLINE, Garner Publications, 2000.*
"Methyltriethoxysilane—SIM6555.0", Gelest, Inc., Material Safety Data Sheet, pp1-3, Aug. 3, 2003.*

* cited by examiner

*Primary Examiner*—David Brunsman
(74) *Attorney, Agent, or Firm*—Welsh & Katz, Ltd.

(57) ABSTRACT

A composition for coloring the surface of a porous substrate is disclosed comprising a colorant, a binding agent, and a water-repelling agent is disclosed wherein upon application of the composition to the surface of the porous substrate, the composition penetrates the surface through the pores of the substrate, and adds color to the surface of the porous substrate. Also disclosed is the method for coloring a substrate, a colored surface of a porous substrate and a process for producing such a composition.

22 Claims, No Drawings

COMPOSITION AND METHOD FOR COLORING THE SURFACE OF A POROUS SUBSTRATE

FIELD OF THE INVENTION

The present invention relates to a composition and method for colouring the surface of a porous substrate, e.g. the surfaces of porous building materials such as blockwork and concrete. The invention has been developed primarily for use in colouring porous building materials, and will be described hereinafter with reference to this application. However, it will be appreciated that the invention is not limited to this particular field of use.

BACKGROUND OF THE INVENTION

Colouring materials, such as pigment granules, have been used to produce concrete and concrete paving of particular colours. The coloured concrete or paving is prepared by adding the colouring material, such as pigment granules, to the mixture used to prepare the concrete or paving. The mixture is then poured and cured to form the coloured concrete or paving. In this process, the colouring materials must be added during the preparation of the concrete or paving. Accordingly, this process cannot be used to change the colour of the concrete or paving once the concrete or paving has been prepared. Replacing an existing concrete or paved surface with a new concrete or paved surface of a different colour can be an expensive and time-consuming activity.

One way of colouring the surface of various building materials such as an existing concrete surface has been to paint the surface with conventional paint compositions. However, this results in a surface having different appearance and texture to the original surface. Further, due to exposure to the elements (e.g. sunlight, rain, etc) and wear (e.g. a surface which is driven on or walked on), over time, the paint on the surface fades, cracks and/or peels giving a very undesirable appearance.

It would therefore be advantageous to provide an alternative composition and method for colouring the surface of a porous substrate.

SUMMARY OF THE INVENTION

In a first aspect, the present invention provides a composition for colouring the surface of a porous substrate, the composition comprising:
  (i) a colorant,
  (ii) a binding agent to cause binding of the composition to the substrate, and
  (iii) a water-repelling agent;

and the composition being formulated whereby, on application of the composition to the surface of the porous substrate, the composition penetrates the surface through the pores of the substrate, and adds colour to the surface of the porous substrate.

In a second aspect, the present invention provides a method for colouring the surface of a porous substrate, the method comprising applying to the surface a composition according to the first aspect of the present invention.

In a third aspect, the present invention provides a porous surface when coloured by a composition according to the first aspect of the present invention.

In a fourth aspect, the present invention provides a process for producing a composition according to the first aspect of the present invention, wherein the colorant comprises a metal oxide, the process comprising the step of water-free grinding the metal oxide, using a grinding solvent and inert grinding beads.

DETAILED DESCRIPTION OF THE INVENTION

The present invention relates to a composition and method for colouring the surface of a porous substrate. On application of the composition to the surface of the porous substrate, the composition penetrates the surface through the pores of the substrate, thereby colouring the surface.

The colorant used in the present invention is preferably an inert inorganic colorant. Typically, the colorant is a metal oxide or a mixture of metal oxides having a particle size of between about 0.1 microns to about 100 microns. Preferably, the particle size is between about 0.1 to about 2 microns. The optimum particle size of the metal oxide particles is about 2 microns.

Typical metal oxides which may be used include: iron oxide red (iron(III) oxide), iron oxide black ($Fe_3O_4$), iron oxide yellow, iron oxide brown (a synthetic mixed phase iron and manganese oxide ($FeMn_2)O_3$ with an iron oxide content as $Fe_2O_3$ as minimum of 80% and maximum of 88%), titanium dioxide (titanium(IV) oxide) (white colour), chrome oxide green (chromium(III) oxide), cobalt blue (cobalt(II) chloride hexahydrate). The metal oxides may be combined in various concentrations to make a virtually limitless range of colours. These metal oxides mixed with other minerals are commercially available as a powder pigment. Such commercially available powder pigments include brands such as Bayferrox Black, Bayferrox Red, Bayferrox Yellow, Bayferrox Brown, Bayertitan, Chrome oxide green, and Lightfast Blue, manufactured by Bayer Hodgsons Pty Ltd.

The binding agent is silicic acid ethyl ester also known as tetraethyl silicate or tetraethoxy silane. The silicic acid ethyl ester reacts with moisture from atmospheric humidity and/or substrata capillary water, releasing alcohol to form silicic acid gel ($SiO_2$ (aq)), a glass-like substance. This glass-like material surrounds the colorant to firmly hold it to the substrate. When the binding agent is a silicic acid ethyl ester, and the substrate is a low alkaline substrate, it is preferable to include a catalyst in the composition to assist with the reaction to cause the binding agent to bind to the substrate. A catalyst is generally required with substrates that are neutral to low in alkalinity (i.e. low pH), e.g. sandstone. Catalysts are generally not required for fresh concrete substrates that usually have high alkalinity (i.e. high pH). An example of a suitable catalyst is titanium n-butoxide.

A typical binding agent is tetraethoxysilane also known as tetraethyl silicate (CAS # 78-10-4). If a catalyst such as titanium n-butoxide is used, the tetraethyl silicate is typically transformed into silicic acid gel ($SiO_2$(aq)) after about two weeks under standard climatic conditions (20° C. and 50% relative humidity).

The water repelling agent is an agent capable of forming a water repellent surface on the substrate. Typical water repelling agents include liquid fluorocarbons (such as a fluorinated polymer in solution at 25% in a mixture such as that made by ATOFINA "FORAPERLE 225"), alkyl alkoxy siloxanes (such as that made by WACKER "290 L") hereinafter referred to as alkyl siloxanes and a catalyst, and alkyl alkoxy silanes (such as isobutyltriethoxysilane (CAS #

17980-47-1)) hereinafter referred to as alkyl silanes and a catalyst, or a combination of silane/siloxane (such as WACKER "BS 44") with a catalyst. The catalyst assists much of the alkyl silane or alkyl siloxane to transform into silanol, a reactive material that is able to break the bond between a hydroxyl group and the substrate so that the silanol can bond with the substrate. The catalyst also assists the alkyl silane, or alkyl siloxane, to polymerise. The polymerized material also enhances the water repellency of the substrate. An example of a catalyst which may be used with the alkyl siloxane or alkyl silane or silane/siloxane combination is titanium n-butoxide (CAS # 5593-70-4).

The composition may further comprise an organic solvent. The organic solvent carries the mixture of colorant, binding agent and water repelling agent onto and into the porous substrate, and then evaporates. Typical organic solvents include aromatic hydrocarbons, ketones, and alcohols such as ethanol. The binding agent (e.g. the silicic acid ethyl ester) may then react with moisture in the porous substrate, and/or the surrounding air, to bind and firmly integrate the colorant into the substrate and protect it from washing out.

In some embodiments of the invention, the composition is in the form of an emulsion in water of the colorant, binding agent and water repelling agent. Such compositions are in the form of a cream or gel-like material which allows the mixture of the colorant, binding agent and water repelling agent to remain in contact with the surface of the substrate for a period of time. This enables more colorant to penetrate the surface of the substrate in a single application of the composition.

The composition comprising the colorant, binding agent and water repelling agent may be prepared from colour concentrates comprising one or more colorants. For example, a number of concentrates containing different colorants may be provided. The concentrates may comprise various components in addition to the colorant, such as a binding agent, a water repelling agent or a solvent. For example, concentrates in colours such as white, red, yellow, green, black, brown and blue may be provided. If desired, the colour concentrates can be mixed to obtain the desired colour, e.g. to match the colour of a surface adjacent to the surface to be treated. An instance where matching of colours may be desired is where part of an existing surface has discoloured, e.g. from wear, fire damage or bleaching.

The colour concentrate, or mixture of colour concentrates, can then be mixed with a binding agent, and/or a water repelling agent and/or other components such as a solvent to prepare a composition according to the first aspect of the invention. In one embodiment, the colour concentrate, or mixture of colour concentrates, may be mixed with a mixture of silicic acid ethyl ester, alkyl silane, titanium n-butoxide, and ethanol to prepare a composition in accordance with the first aspect of the present invention. In an another embodiment, a mixture of the colour concentrate, alkyl silane, titanium n-butoxide and ethanol may be mixed with silicic acid ethyl ester to prepare a composition in accordance with the first aspect of the present invention.

The concentrate can be made up in various colours including white, red, yellow, green, brown, black and blue. Preferably, these concentrates have a relative density of between 0.887 and 2.130. These concentrates can be combined and vigorously mixed to make the colour desired for a particular application. The concentrates can also be combined to match a particular desired colour.

The composition may be applied to the surface of the porous substrate by any means known in the art for applying a composition to a surface. Typically, airless spraying is used to apply the composition to the surface of the substrate.

If desired, a more intense colour may be achieved by applying additional coats of the composition, for example, at intervals of more than 12-hours. Depending on the absorbency, the type of substrate and the amount of the composition used, the composition typically penetrates about 0.1 mm and 100 mm into the surface of the substrate.

Advantageously, when the composition of the present invention is applied to the surface of a porous substrate, a permanently coloured surface results. The colouring of the surface is permanent in the sense that the colouring endures for the life of the substrate surface. Surfaces treated with the composition of the present invention do not require re-treatment to maintain the colour over time.

The composition of the present invention can be applied to the surface of a porous substrate in a manner which results in a uniform colour and appearance of the coloured surface.

Because the composition is non film-forming, the application of the composition does not significantly change the texture or feel of the surface of the porous substrate, and does not result in a coloured surface which flakes or peels.

The composition of the present invention, when applied to the surface of a porous substrate, results in a coloured surface which is light-fast, colour-fast and weather-stable once dry. The composition may be formulated in virtually any colour.

The composition may be formulated to also reduce water uptake and minimise moss growth, freeze-thaw spalling and efflorescence (97% reduction). The composition may be formulated to also provide a chloride ion salt screen which is useful for marine, car park and pool areas.

The composition may be formulated for application to surfaces intended for indoor or outdoor use. The composition can be used for a variety of applications, including the colouring of building facades, roads, paving, paths, render, floors, walls, car parks, worktops, roofs, patios, public entertaining areas and pool surrounds.

Suitable porous substrates include building materials, such as concrete, cement render, natural stone, cement-based stone and paving, clay, terracotta, cast stone, sandstone, limestone, marble, granite, terrazzo, porcelain, vitreous tile, brick, block and grout.

The composition of the present invention may be formulated to seal hairline cracks of up to about 0.3 mm in the surface of the substrate. The composition may also be formulated to be able to consolidate loose and friable particles on the surface of the substrate. The composition may also be formulated to be very resistant to alkali. For example, the composition may be formulated to be stable when in contact with cement-based materials. The composition may be formulated to be water vapour permeable so that there is no build-up of sub-surface moisture.

The colorant for use in the composition of the present invention may be produced by water-free grinding a metal oxide in the presence of a grinding solvent and inert grinding beads in an enclosed grinding apparatus. For example, the inert grinding beads may be small glass spheres, or the like. Typically, the metal oxide is ground until the average particle size is between about 0.1 and about 100 microns, preferably between 0.1 and about 2 microns. More preferably, the particle size is about 2 microns. In order to achieve a particle size of about 2 microns, the mixture is usually ground for approximately 30 minutes. The grinding solvent preferably has a low viscosity in order to assist in keeping the temperature of the mixture below 30° C. Under these conditions, the grinding apparatus can be used for a longer period of time to achieve a finer particle size. The grinding solvent may be a mixture of various organic solvents and/or other substances. For example, the grinding solvent may be a mixture of isobutyltriethoxysilane (CAS # 17980-47-1), N-octyltriethoxy silane (CAS # 2943-75-1), titanium n-butoxide (CAS # 5593-70-4) and ethanol (CAS # 64-17-5). Other examples of the grinding solvent which can be used include alcohol, alkyl silanes, alkyl siloxanes.

A preferred embodiment of the present invention will now be described, by way of example only, with reference to the following example.

EXAMPLE

An example of a ready-to-use composition in the colour of "Taupe". The composition comprises the following components described below:
1. "Taupe" concentrate; and
2. "Clear"

"Taupe" Concentrate:

Commercially available pigments containing metal oxide particles ("Bayertitan", "Bayferrox Black", "Bayferrox Yellow" and "Bayferrox Red") were obtained. Each pigment was then mixed with a grinding solvent and the metal oxide particles ground with inert grinding beads to an appropriate particle size (between about 0.1 and about 100 microns).

The grinding solvent is a room temperature mixture with a relative density of approximately 0.826 consisting of the following components:
a) Isobutyltriethoxysilane (CAS # 17980-47-1), 6.688 kg
b) N-Octyltriethoxy silane (CAS # 2943-75-1), 0.350 kg
c) Titanium n-butoxide (CAS # 5593-70-4), 0.158 kg
d) ethanol (CAS # 64-17-5), 9.322 kg The resulting mixtures of ground metal oxide particles and grinding solvent were then used to prepare the "Taupe" concentrate. The "Taupe" concentrate is a room temperature mixture with a relative density of 1.642 with the following components:
1. 47.63 grams/22.36 ml of the ground mixture of "Bayertitan" and grinding solvent, the mixture having a relative density of approximately 2.130 (white colour).
2. 13.98 grams/8.32 ml of the ground mixture of "Bayferrox Black" and grinding solvent, the mixture having a relative density of approximately 1.680 (black colour).
3. 35.27 grams/28.37 ml of the ground mixture of "Bayferrox Yellow" and grinding solvent, the mixture having a relative density of approximately 1.243 (yellow colour).
4. 3.12 grams/1.83 ml of the ground mixture of "Bayferrox Red" and grinding solvent, the mixture having a relative density of approximately 1.702 (red colour).

"Clear":

The "Clear" is a room temperature mixture with a relative density of approximately 0.839 consisting of the following components:
a) Isobutyltriethoxysilane (CAS # 17980-47-1), 5.280 kg
b) Tetraethoxysilane (CAS # 78-10-4), 5.640 kg
c) Titanium n-butoxide (CAS # 5593-70-4), 0.149 kg
d) Ethanol (CAS # 64-17-5), 14.102 kg Application of the Composition:

The ability of the composition to impart its colour to the surface of the substrate being coloured will depend on the absorbency of the substrate. For a medium absorbent concrete paver, a suitable composition is prepared by stirring 400 ml of the "Taupe" concentrate into 20 litres of the "Clear", and then continuing stirring for 60 seconds. The composition can then be applied as follows:

1) Test composition on a small area, and allow a 12-hour cure time to determine the ease of application and desired results.
2) Ensure surfaces to be treated are dry, clean and free of residues.
3) Composition is applied without thinning.
4) Generously saturate the surface with the composition using a low-pressure hand spray, a clean brush, or similar. After application, the surface should have a mirror-like "wet" look for 3 to 5 seconds.
5) After a minimum of 12-hours, repeat Step 4. If required, re-treat as required, leaving 12-hours between coats, to achieve the desired result.
6) Total application rate is approximately 1 litre per 2 to 8 square metres (80 to 320 sq.ft. per US gallon), depending on surface absorption.
7) Allow 12-hours for composition to cure then polish surface with a clean white dry cloth to remove any residues.

Although the invention has been described with reference to a particular example, it will be appreciated by those skilled in the art that the invention may be embodied in many other forms.

In the claims which follow and in the preceding description of the invention, except where the context requires otherwise due to express language or necessary implication, the word "comprising", or a grammatical variation thereof, is used in the sense of "including", i.e. the features specified may be associated with further features in various embodiments of the invention.

The invention claimed is:

1. A composition for colouring the surface of a porous substrate, the composition comprising:
   (i) a colorant, which is a metal oxide or a mixture of metal oxides, wherein the colorant has a particle size of between about 0.1 microns and about 100 microns.
   (ii) a binding agent to cause binding of the composition to the substrate, wherein the binding agent is tetraethyl silicate, and
   (iii) a water-repelling agent selected from the group consisting of
      a. liquid fluorocarbons,
      b. alkyl alkoxy silanes and a catalyst therefor,
      c. alkyl alkoxy siloxanes and a catalyst therefor, and
      d. mixtures of alkyl alkoxy silanes, alkyl alkoxy siloxanes and a catalyst therefor,
   and the composition being formulated whereby, on application of the composition to the surface of the porous substrate, the composition penetrates the surface through the pores of the substrate, and colors the surface of the porous substrate.

2. The composition according to claim 1, wherein the metal oxide or mixture of metal oxides is selected from the group consisting of iron oxide red (iron(III) oxide), iron oxide black ($Fe_3O_4$), iron oxide yellow, iron oxide brown, titanium(IV) oxide, chromium(III) oxide (chrome oxide green), cobalt (II) chloride hexahydrate (cobalt blue), and mixtures thereof.

3. The composition according to claim 1, wherein the colorant has a particle size of from about 0.1 to about 2 microns.

4. The composition according to claim 1, wherein the water repelling agent is an alkyl alkoxy silane which is isobutyltriethoxysilane, and a catalyst therefor.

5. The composition according to claim 1, where the catalyst is titanium n-butoxide.

6. The composition according to claim 1, further comprising an organic solvent.

7. The composition according to claim 6, wherein the organic solvent is selected from the group consisting of aromatic hydrocarbons, ketones, and alcohols.

8. The composition according to claim 7, wherein the organic solvent is an alcohol which is ethanol.

9. A composition according to claim 1 further comprising water.

10. A composition according to claim 9 wherein the composition is in the form of an emulsion in water.

11. A composition according to claim 10 wherein the composition is in the form of a cream or a gel-like material.

12. A composition for colouring the surface of a porous substrate, the composition comprising:
   (i) a colorant, which is a metal oxide or a mixture of metal oxides, wherein the colorant has a particle size of about 2 microns,
   (ii) a binding agent to cause binding of the composition to the substrate, wherein the binding agent is tetraethyl silicate, and
   (iii) a water-repelling agent selected from the group consisting of
      a. liquid fluorocarbons,
      b. alkyl alkoxy silanes and a catalyst therefor,
      c. alkyl alkoxy siloxanes and a catalyst therefor, and
      d. mixtures of alkyl alkoxy silanes, alkyl alkoxy siloxanes, and a catalyst therefor,
   and the composition being formulated whereby, on application of the composition to the surface of the porous substrate, the composition penetrates the surface through the pores of the substrate, and colors the surface of the porous substrate.

13. A composition according to claim 12, further comprising water.

14. A composition according to claim 13, wherein the composition is in the form of an emulsion in water.

15. A composition according to claim 14, wherein the composition is in the form of a cream or a gel-like material.

16. A composition for colouring the surface of a porous substrate, the composition comprising:
   (i) a colorant which is a metal oxide or a mixture of metal oxides,
   (ii) a binding agent to cause binding of the composition to the substrate, wherein the binding agent is tetraethyl silicate, and
   (iii) a water-repelling agent selected from the group consisting of
      a. liquid fluorocarbons;
      b. alkyl alkoxy silanes and titanium n-butoxide as a catalyst;
      c. alkyl alkoxy siloxanes and titanium n-butoxide as a catalyst;
      d. mixtures of alkyl alkoxy silanes and alkyl alkoxy siloxanes and titanium n-butoxide as a catalyst,
   and the composition being formulated whereby, on application of the composition to the surface of the porous substrate, the composition penetrates the surface through the pores of the substrate, and colors the surface of the porous substrate.

17. The composition according to claim 16, wherein the colorant has a particle size of between about 0.1 microns and about 100 microns.

18. The composition according to claim 16, wherein the water repelling agent is an alkyl alkoxy silane which is isobutyltriethoxysilane and a catalyst therefor.

19. A composition according to claim 16 further comprising water.

20. A composition according to claim 19 wherein the composition is in the form of an emulsion in water.

21. A composition according to claim 20 wherein the composition is in the form of a cream or a gel-like material.

22. A composition for colouring the surface of a porous substrate, the composition comprising:
   (i) a colorant which is a metal oxide or a mixture of metal oxides, wherein the metal oxide or mixture of metal oxides has a particle size of about 2 microns,
   (ii) a binding agent to cause binding of the composition to the substrate, wherein the binding agent is tetraethyl silicate, and
      a. a water-repelling agent comprising an alkyl alkoxy silane which is isobutyltriethoxysilane and a catalyst therefore, wherein the composition is in the form of an emulsion in water, and the composition being formulated whereby, on application of the composition to the surface of the porous substrate, the composition penetrates the surface through the pores of the substrate, and colors the surface of the porous substrate.

* * * * *